(12) United States Patent
Yamamoto et al.

(10) Patent No.: US 8,645,054 B2
(45) Date of Patent: Feb. 4, 2014

(54) NAVIGATION SYSTEM

(75) Inventors: Takeshi Yamamoto, Tokyo (JP); Satoru Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 194 days.

(21) Appl. No.: 13/202,632

(22) PCT Filed: Apr. 14, 2010

(86) PCT No.: PCT/JP2010/002696
§ 371 (c)(1),
(2), (4) Date: Aug. 22, 2011

(87) PCT Pub. No.: WO2010/122739
PCT Pub. Date: Oct. 28, 2010

(65) Prior Publication Data
US 2011/0307170 A1 Dec. 15, 2011

(30) Foreign Application Priority Data
Apr. 20, 2009 (JP) ................................. 2009-101922

(51) Int. Cl.
*G01C 21/00* (2006.01)
(52) U.S. Cl.
USPC ....................................................... 701/400
(58) Field of Classification Search
USPC .......................... 701/400, 409, 410, 430, 432
See application file for complete search history.

(56) References Cited

U.S. PATENT DOCUMENTS

| | | | |
|---|---|---|---|
| 6,535,813 B1 | 3/2003 | Schmidt et al. | |
| 2002/0055340 A1 | 5/2002 | Seto et al. | |
| 2003/0028312 A1 | 2/2003 | Matsuoka et al. | |
| 2006/0276150 A1 | 12/2006 | Ogasawara | |
| 2008/0009279 A1* | 1/2008 | Sakawa ......................... | 455/423 |
| 2009/0024322 A1* | 1/2009 | Tomita et al. ................. | 701/211 |

FOREIGN PATENT DOCUMENTS

| | | |
|---|---|---|
| DE | 199 36 114 A1 | 2/2001 |
| DE | 10 2006 026 215 A1 | 12/2006 |
| DE | 600 32 969 T2 | 10/2007 |
| JP | 5-23620 U | 3/1993 |
| JP | 8-307296 A | 11/1996 |
| JP | 9-161195 A | 6/1997 |
| JP | 2006-064550 A | 9/2006 |
| JP | 2006-279323 A | 10/2006 |
| JP | 2006-279742 A | 10/2006 |
| JP | 2007-89083 A | 4/2007 |
| JP | 2008-85464 A | 4/2008 |
| JP | 2009-8595 A | 1/2009 |

* cited by examiner

*Primary Examiner* — Kim T Nguyen
(74) *Attorney, Agent, or Firm* — Birch, Stewart, Kolasch & Birch, LLP

(57) ABSTRACT

A navigation system includes a map database 11 that stores map information, broadcast wave receivable area information indicating an area capable of receiving a broadcast wave, and broadcast wave reception blocked area information indicating an area incapable of receiving a broadcast wave; a vehicle position detecting unit 15 for detecting a current position of a vehicle; a control unit for estimating a direction of travel from the current position of the vehicle detected by the vehicle position detecting unit, and for deciding, from the broadcast wave receivable area information and broadcast wave reception blocked area information acquired from the map database, as to whether an area capable of receiving the broadcast wave continuously exists in the direction of travel estimated; and an output unit for producing a message indicating existence of an area capable of receiving the broadcast wave continuously in response to a decision result of the control unit.

8 Claims, 6 Drawing Sheets

NAVIGATION SYSTEM

TECHNICAL FIELD

The present invention relates to a navigation system for guiding a user to a destination, and particularly to a technique for receiving a broadcast in cooperation with its navigation functions.

BACKGROUND ART

In a recent navigation system, an HDD (Hard Disk Drive) becomes the main current as a storage medium of map information, and the storage capacity of data increases year by year, thereby increasing retainable map information (facility information, road information and the like) as well. Thus, it becomes possible to store various useful information besides the map information in advance to provide information convenient for a user.

As one of onboard apparatuses, a broadcast receiver is known. The broadcast receiver is mounted on a vehicle and operates thereon. Accordingly, a state can occur in which a broadcast wave received state becomes worse depending on the position of the vehicle. Thus, a technique has been developed which notifies a user of the broadcast wave received state. For example, as for an onboard radio receiver that automatically switches to a traffic information broadcast even though it is tuned at present to another broadcasting station or a source, Patent Document 1 discloses a radio receiver that inhibits an alarm operation or automatic search in the case of temporary reduction in electric field strength such as when passing through a tunnel.

In addition, Patent Document 2, considering a case where an onboard FM multiplex broadcast receiving device sometimes cannot display information given by an FM multiplex broadcast even though it can output sounds of the FM broadcast because of weak electric field in a bad receiving condition such as when it moves to a place in a bad receiving condition, discloses an FM multiplex broadcast receiving device capable of notifying a user of a reason for the difficulty of displaying although the sounds are audible.

PRIOR ART DOCUMENT

Patent Document

Patent Document 1: Japanese Utility Model Laid-Open No. 5-23620/1993.
Patent Document 2: Japanese Patent Laid-Open No. 8-307296/1996.

DISCLOSURE OF THE INVENTION

Both the techniques disclosed in the foregoing Patent Document 1 and Patent Document 2 decide the received state of the broadcast wave from the electric field strength currently being received. Accordingly, when they notify the user that they cannot receive the broadcast wave, they have already become difficult to receive normally, thereby offering a problem in that their function of notifying the user of the received state of the broadcast wave in advance is impaired.

The present invention is implemented to solve the foregoing problem. Therefore it is an object of the present invention to provide a navigation system capable of notifying a user of the received state of the broadcast wave in advance.

To solve the foregoing problem, the present invention includes: a map database that stores map information, broadcast wave receivable area information indicating an area capable of receiving a broadcast wave, and broadcast wave reception blocked area information indicating an area incapable of receiving a broadcast wave; a current position detecting unit for detecting a current position; a control unit for estimating a direction of travel from the current position detected by the current position detecting unit, and for deciding, from the broadcast wave receivable area information and the broadcast wave reception blocked area information acquired from the map database, as to whether an area capable of receiving the broadcast wave continuously exists in the direction of travel estimated; and an output unit for producing a message indicating existence of an area capable of receiving the broadcast wave continuously in response to a decision result of the control unit, wherein, the control unit comprises a guidance route arithmetic unit for searching for a route which connects the current position to a destination and is capable of receiving the broadcast wave continuously according to the broadcast wave receivable area information and the broadcast wave reception blocked area information acquired from the map database; and the output unit shows the route searched for by the guidance route arithmetic unit, and produces a message indicating whether the route searched for includes an area incapable of receiving the broadcast wave continuously or not.

According to the present invention, it is configured in such a manner as to provide a user in advance with a message indicating whether an area capable of receiving the broadcast wave continuously exists or not in accordance with the broadcast wave receivable area information and broadcast wave reception blocked area information stored in the map database rather than using the strength of the currently received electric field as the conventional technique carries out. Accordingly, it can notify the user of the received state of the broadcast wave at timing earlier than the conventional system.

EMBODIMENTS FOR CARRYING OUT THE INVENTION

An embodiment for carrying out the invention will now be described with reference to the accompanying drawings to explain the present invention in more detail.

Embodiment 1

The navigation system of an embodiment 1 in accordance with the present invention is configured in such a manner that it searches, when a user desires continuous reception of a broadcast wave, for a route enabling continuous reception, or notifies a user in advance that the reception of the broadcast wave received at present will become impossible during traveling from now on according to broadcast wave receivable area information indicating an area capable of receiving a broadcast wave or according to broadcast wave reception blocked area information indicating an area incapable of receiving a broadcast wave because of a tunnel or mountains, both information being stored in a map database in advance.

Figure 1:
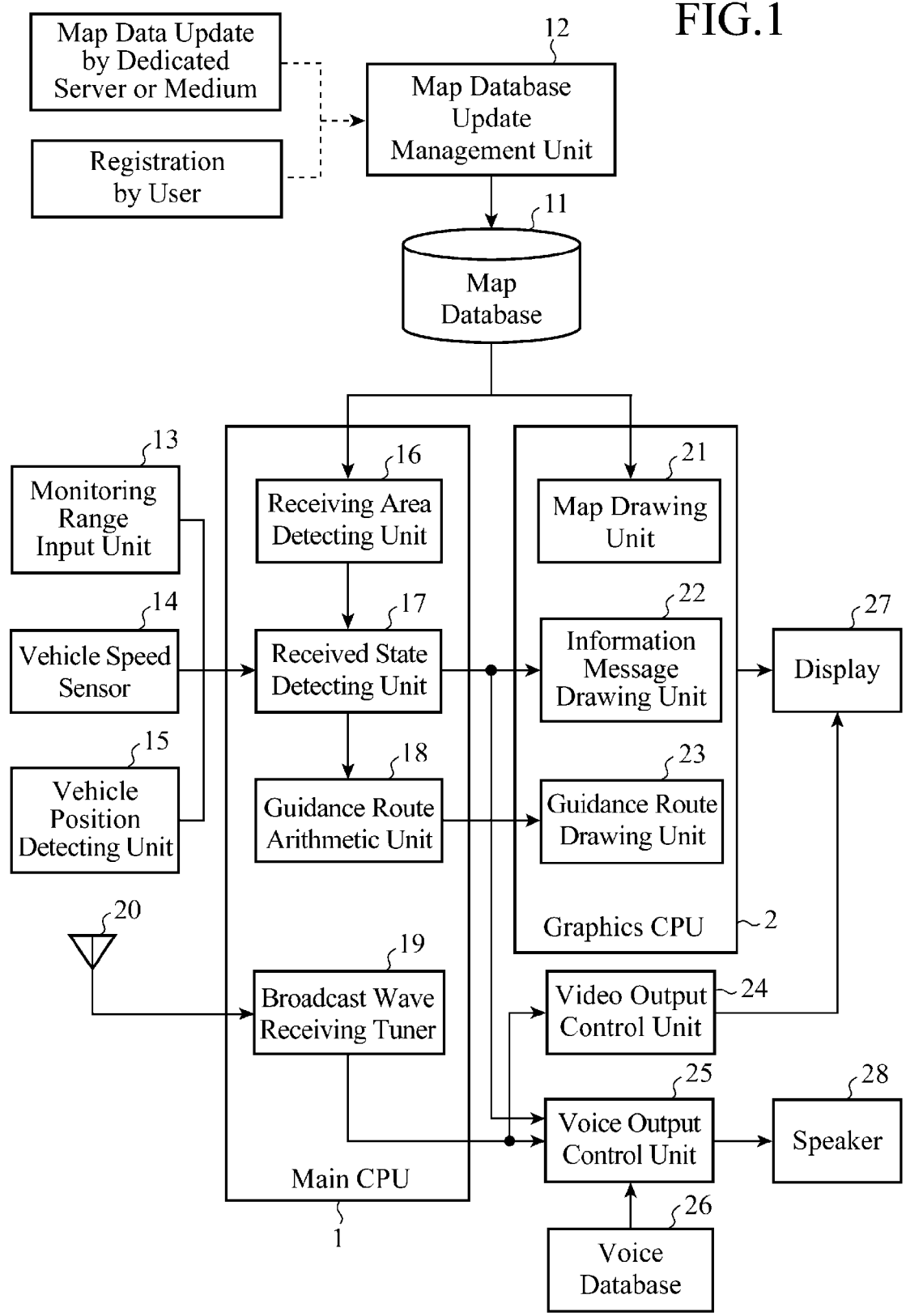
FIG. 1 is a block diagram showing a configuration of the navigation system of an embodiment 1 in accordance with the present invention.

FIG. 1 is a block diagram showing a configuration of the navigation system of the embodiment 1 in accordance with the present invention. The navigation system comprises a map database 11, a map database update management unit 12, a monitoring range input unit 13, a vehicle speed sensor 14, a vehicle position detecting unit 15, a receiving area detecting unit 16, a received state detecting unit 17, a guidance route arithmetic unit 18, a broadcast wave receiving tuner 19, a broadcast wave receiving antenna 20, a map drawing unit 21, an information message drawing unit 22, a guidance route drawing unit 23, a video output control unit 24, a voice output control unit 25, a voice database 26, a display 27 and a speaker 28.

Among these components, the receiving area detecting unit 16, received state detecting unit 17, guidance route arithmetic unit 18 and broadcast wave receiving tuner 19 are realized by processing executed by a main CPU (Central Processing Unit) 1, and the map drawing unit 21, information message drawing unit 22 and guidance route drawing unit 23 are materialized by a graphics CPU 2. The main CPU 1 corresponds to a control unit in accordance with the present invention.

The map database 11 stores, in addition to map information (road information, facility information and the like), broadcast wave receivable area information and broadcast wave reception blocked area information. The information stored in the map database 11 is read out by the main CPU 1 and graphics CPU 2.

The map database update management unit 12 updates necessary information in the information stored in the map database 11 when a dedicated server or a medium carries out map data update at regular intervals. In addition, the map database update management unit 12 updates, when information (such as information indicating a broadcast wave received state on the map) is registered manually at any timing, the information stored in the map database 11 using the information registered. This makes it possible to cope up with environmental changes such as expansion of related equipment.

The monitoring range input unit 13 receives, in response to a user operation, information designating a monitoring range of observing the received state of a broadcast wave, that is, monitoring range information (information such as radius of *m) indicating receivable/unreceivable area of the broadcast wave, and delivers to the received state detecting unit 17. The vehicle speed sensor 14 detects the vehicle speed from vehicle speed pulses acquired from a vehicle (not shown) in which the navigation system is mounted, and delivers to the received state detecting unit 17 as vehicle speed information.

The vehicle position detecting unit 15 detects the current position of the vehicle from GPS signals received by a GPS (Global Positioning System) receiver, and delivers to the received state detecting unit 17 as vehicle position information. The receiving area detecting unit 16 detects a broadcast wave receiving area from the broadcast wave receivable area information and broadcast wave reception blocked area information acquired from the map database 11 and delivers to the received state detecting unit 17 as broadcast wave receiving area information.

The received state detecting unit 17 collectively manages the monitoring range information delivered from the monitoring range input unit 13, the vehicle speed information delivered from the vehicle speed sensor 14, the vehicle position information delivered from the vehicle position detecting unit 15, and the broadcast wave receiving area information delivered from the receiving area detecting unit 16, and delivers necessary information to the guidance route arithmetic unit 18. In addition, the received state detecting unit 17 delivers, when the received state of the broadcast wave changes, information indicating that the broadcast wave received state changes to the information message drawing unit 22 and voice output control unit 25.

The guidance route arithmetic unit 18 searches for a route from the vehicle position indicated by the vehicle position information delivered from the vehicle position detecting unit 15 to a destination indicated by destination information supplied from an input device not shown (when a transit point is input, the route passing through the transit point indicated by the transit point information). In addition, when carrying out a search considering continuous reception of the broadcast wave, the guidance route arithmetic unit 18 searches for a route based on the information from the received state detecting unit 17. The route searched by the guidance route arithmetic unit 18 is delivered to the guidance route drawing unit 23 as route data.

The broadcast wave receiving tuner 19 decides the type of data indicated by the received signal acquired by receiving the broadcast wave with the broadcast wave receiving antenna 20, delivers received video data (video data of television or the like) contained in the received signal to the video output control unit 24 according to the decision result, and delivers received voice data (voice data of radio or television or the like) contained in the received signal to the voice output control unit 25.

The map drawing unit 21 displays a map on the screen of the display 27 in accordance with the map information acquired from the map database 11. The information message drawing unit 22 displays a telop indicating changes in the received state of the broadcast wave on the screen of the display 27 in accordance with the information delivered from the received state detecting unit 17. The guidance route drawing unit 23 displays the guidance route on the screen of the display 27 in accordance with the route data delivered from the guidance route arithmetic unit 18.

The video output control unit 24 generates a video signal from the received video data delivered from the broadcast wave receiving tuner 19, and delivers to the display 27. The voice output control unit 25 collectively manages guiding voice, broadcast wave received state change informing voice, and received voice data delivered from the main CPU 1, and voice data acquired from the voice database 26, generates a voice signal from them, and delivers to the speaker 28.

The voice database 26 stores voice data that can be defined in advance such as the guiding voice, broadcast wave received state change informing voice and the like. The display 27, which corresponds to a part of the output unit of the present invention, displays information on its screen in accordance with the video signal delivered from the graphics CPU 2. The speaker 28, which corresponds to a part of the output unit of the present invention, outputs voice in accordance with the voice signal delivered from the voice output control unit 25.

Figure 2:
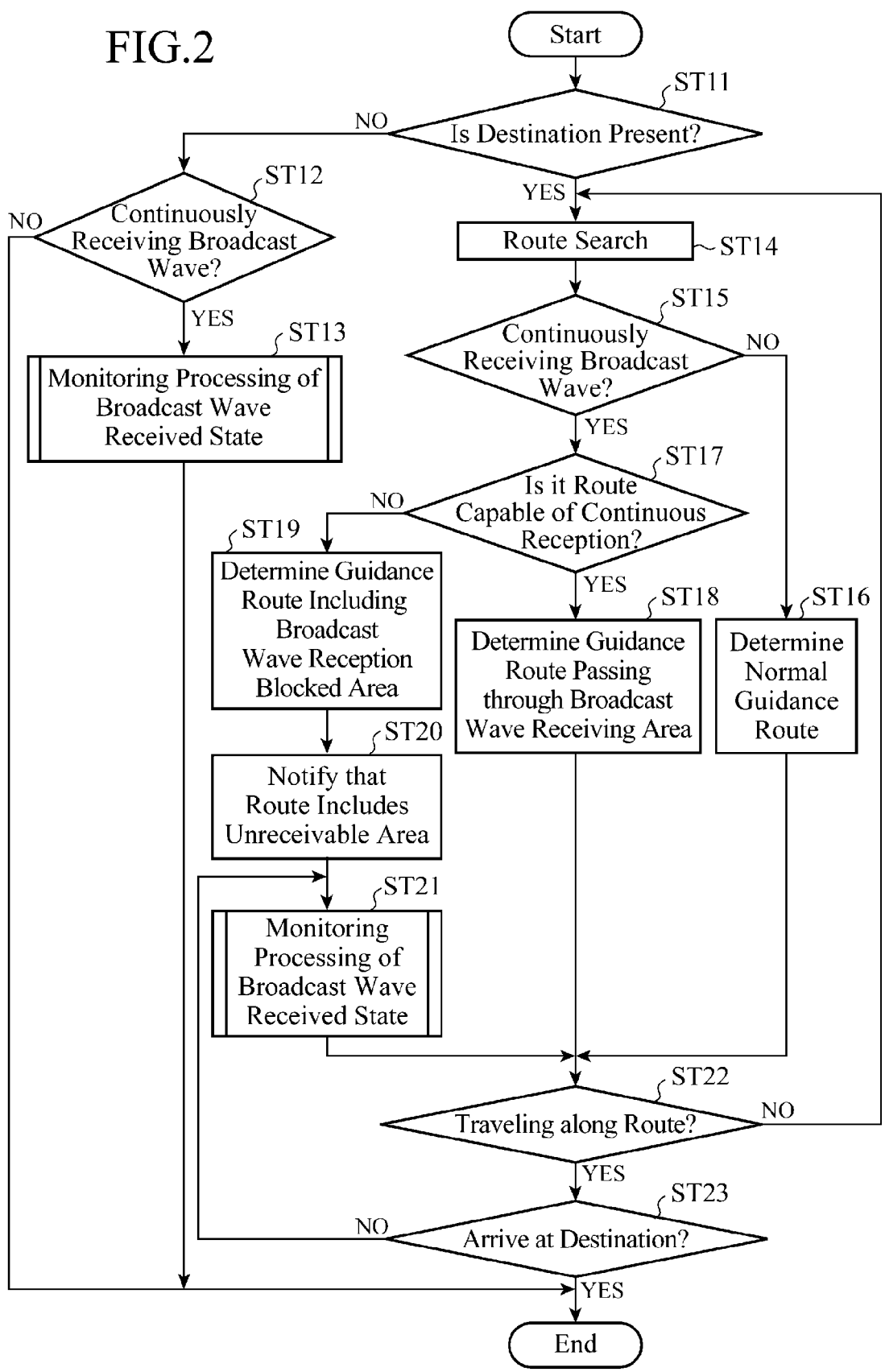
FIG. 2 is a flowchart showing the operation of the navigation system of the embodiment 1 in accordance with the present invention, centering on broadcast wave received state informing processing.

Next, the operation of the navigation system of the embodiment 1 in accordance with the present invention with the foregoing configuration will be described. First, the broadcast wave received state informing processing executed by the navigation system will be described with reference to the flowchart shown in FIG. 2. In the following description, it is supposed that a broadcast wave is being received.

In the broadcast wave received state informing processing, it is checked whether a destination is present or not (step ST11). More specifically, the main CPU 1 checks whether a destination is input or not from the input device not shown. At this step ST11, if a decision is made that no destination is present, it is recognized that a route search is not carried out and a route is not present, followed by checking whether to receive a broadcast wave continuously or not (step ST12). The processing at this step ST12 is executed by inquiring of a user by displaying a telop for confirming whether to receive the currently received broadcast wave continuously or not on the display 27. At this step ST12, if a decision of not receiving the broadcast wave continuously is made, the broadcast wave received state informing processing is terminated.

On the other hand, if a decision of continuously receiving the broadcast wave is made at step ST12, the direction of travel is estimated from the current position of the vehicle detected by the vehicle position detecting unit 15, followed by executing the broadcast wave received state monitoring processing on the road in the direction of travel estimated (step ST13). The broadcast wave received state monitoring processing provides a user with the information indicating the received state at appropriate timing. Details of the broadcast wave received state monitoring processing will be described later. After that, the broadcast wave received state informing processing is terminated.

Figure 4:
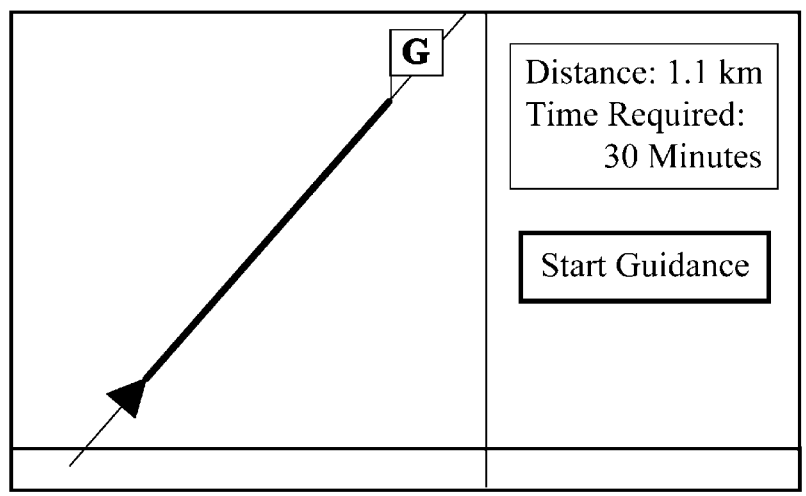
FIG. 4 is a diagram showing an example of a search completion picture displayed when a route search carried out by the navigation system of the embodiment 1 in accordance with the present invention has been completed.

If a decision is made at the foregoing step ST11 that a destination is present, a route search is executed (step ST14). More specifically, the guidance route arithmetic unit 18 searches for a route from the current position of the vehicle indicated by the vehicle position information acquired from the vehicle position detecting unit 15 to the destination designated by the destination information input from the input device not shown (when transit point information is input, a route passing through the transit point). When the route search at this step ST14 is completed, the search completion picture as shown in FIG. 4 is shown on the display 27. The search completion picture shows the route from the vehicle mark (triangular mark) to the destination G, the distance to the destination G and the time required to the destination G, together with a "guide start" button. Touching the "guide start" button will start the guidance.

Figure 5:
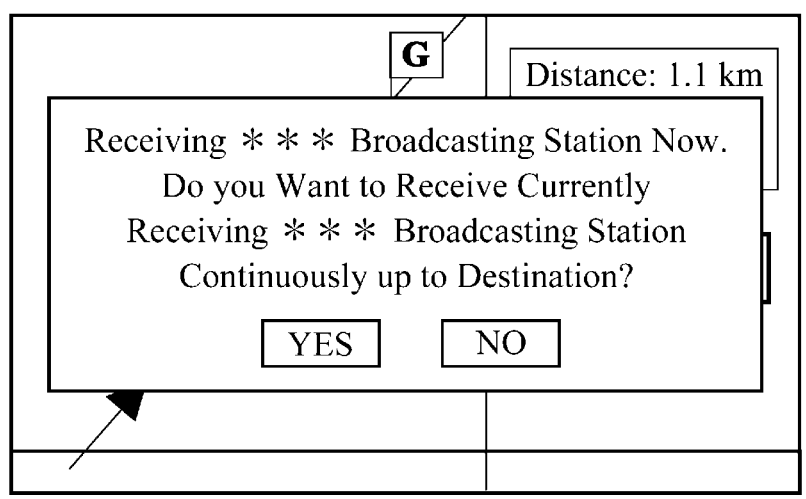
FIG. 5 is a diagram showing an example of a telop for confirming continuous reception displayed on the navigation system of the embodiment 1 in accordance with the present invention.

Subsequently, whether to receive the broadcast wave continuously or not is checked (step ST15). The processing at step ST15 is carried out by inquiring of the user by displaying a telop for confirming whether to continuously receive the currently received broadcast wave up to the arrival at the destination or not on the display 27 as shown in FIG. 5, for example. In this case, if the user desires to receive continuously, he or she touches the "YES" button on the telop, otherwise, touches the "NO". At this step ST15, if a decision of not receiving the broadcast wave continuously is made, then it is determined that the normal guidance route is employed which does not consider whether the broadcast wave can be received or not (step ST16). After that, the sequence proceeds to step ST22.

If a decision of receiving the broadcast wave continuously is made at the foregoing step ST15, then whether the route enables receiving the broadcast wave continuously or not is checked (step ST17). More specifically, the main CPU 1 checks whether the route searched for at step ST14 includes an area incapable of receiving the broadcast wave. If a decision is made at this step ST17 that the route enables receiving the broadcast wave continuously, then it is determined to employ the guidance route in the broadcast wave receiving area (step ST18). After that, the sequence proceeds to step ST22.

If a decision is made at the foregoing step ST17 that the route cannot enable receiving the broadcast wave continuously, then it is determined to employ a guidance route including the broadcast wave reception blocked area (step ST19). Subsequently, a message indicating that the route includes an unreceivable area is shown (step ST20).

Subsequently, the broadcast wave received state monitoring processing is executed (step ST21). The broadcast wave received state monitoring processing provides the user with the information on the received state at appropriate timing. Details of the broadcast wave received state monitoring processing will be described later. After that, the sequence proceeds to step ST22.

Figure 6:
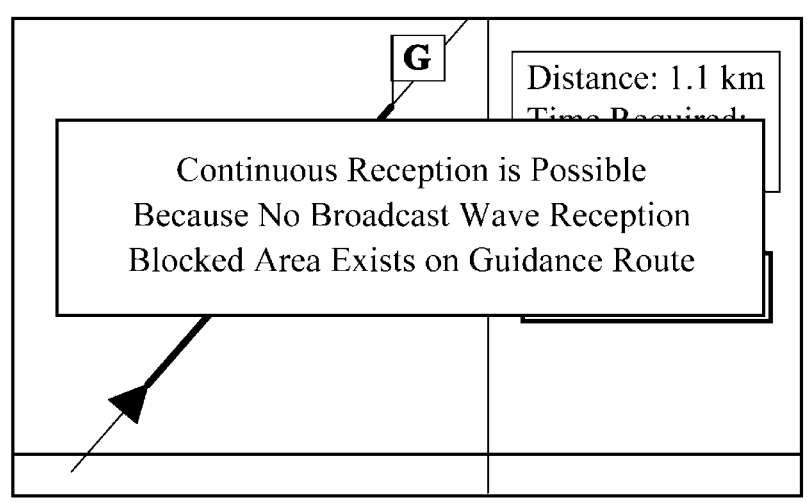
FIG. 6 is a diagram showing an example of a telop informing that a route displayed on the navigation system of the embodiment 1 in accordance with the present invention does not include a broadcast wave reception blocked area.

At step ST22, whether the vehicle is traveling along the route or not is checked. If a decision is made at this step ST22 that it is not traveling along the route, a departure from the route is recognized, and the sequence is returned to step ST14 to execute the route search again. If the route searched by the route search does not include a broadcast wave reception blocked area, a telop as shown in FIG. 6 indicating that the route does not include a broadcast wave reception blocked area is shown on the display 27.

Figure 7:
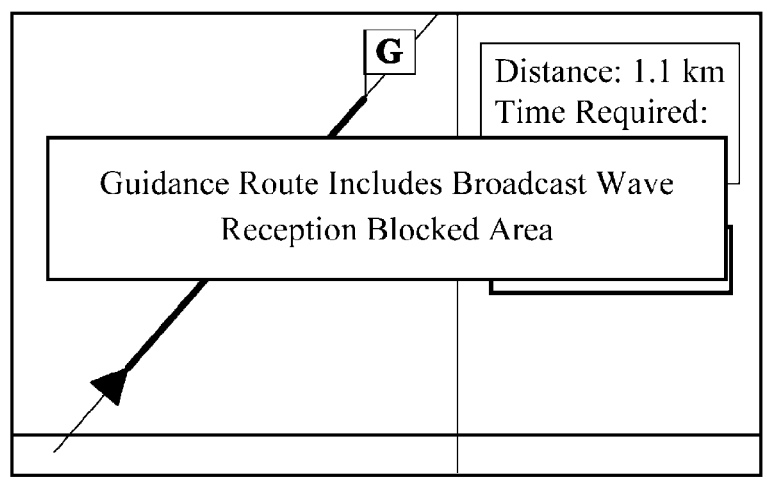
FIG. 7 is a diagram showing an example of a telop informing that a route displayed on the navigation system of the embodiment 1 in accordance with the present invention includes a broadcast wave reception blocked area.
Figure 8:
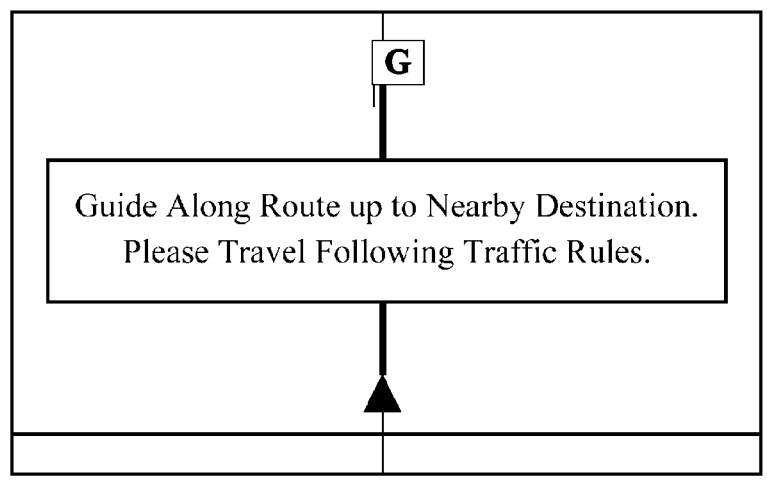
FIG. 8 is a diagram showing a current position picture displayed when the navigation system of the embodiment 1 in accordance with the present invention determines a guidance route.

On the other hand, if the route includes a broadcast wave reception blocked area, a telop as shown in FIG. 7 indicating that the route includes a broadcast wave reception blocked area is shown on the display 27. After that, the processing after the above-mentioned step ST15 is repeated. After the telop is deleted because of a timeout and then when the "guide start" button (see FIG. 4) is touched, the guidance route is determined, and a current position picture as shown in FIG. 8, for example, is shown on the display 27 to start the guidance.

If a decision is made at the foregoing step ST22 that the vehicle is traveling along the route, then whether the vehicle arrives at the destination or not is checked (step ST23). If a decision is made at this step ST23 that it arrives at the destination, the broadcast wave received state informing processing is terminated. On the other hand, if a decision is made at step ST23 that it has not yet arrived at the destination, the sequence is returned to step ST21 to execute the broadcast wave received state monitoring processing to repeat the above-mentioned processing. Thus, until the vehicle arrives at the destination, the broadcast wave received state monitoring processing provides the user with the changes in the received state in accordance with monitoring range conditions.

Figure 9:
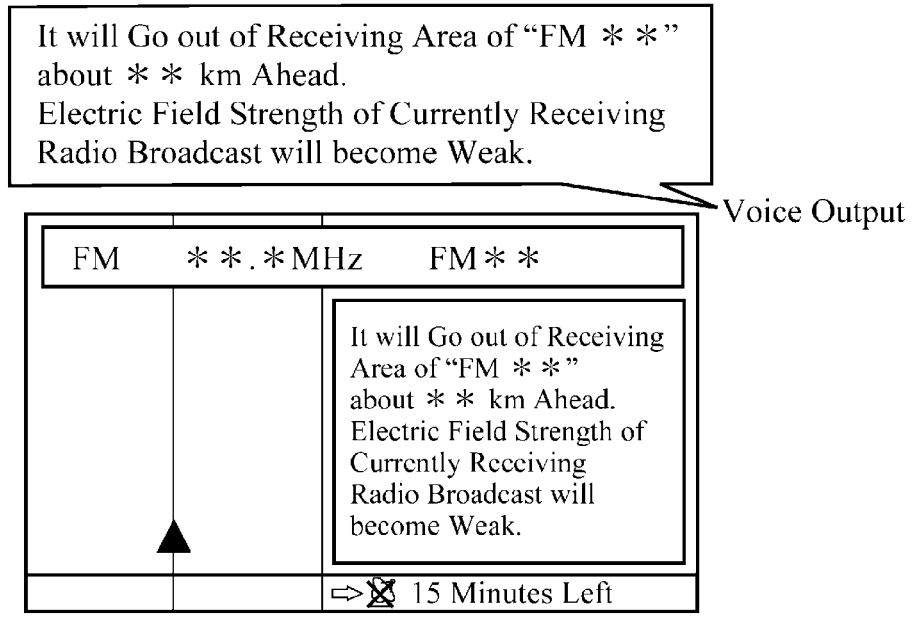
FIG. 9 is a diagram showing a picture displayed when the navigation system of the embodiment 1 in accordance with the present invention cannot receive a broadcast wave continuously.

When the above-mentioned processing detects a broadcast wave reception blocked area  km ahead during traveling, then as shown in FIG. 9, for example, a message that the vehicle will go out of the receiving area of the currently received broadcasting station  km ahead is shown on the screen of the display 27. In addition, the voice guidance is given, and an estimated time period taken to go out of the receiving area is shown in a picture on the display 27. This holds true in the case where no route is present.

Figure 10:
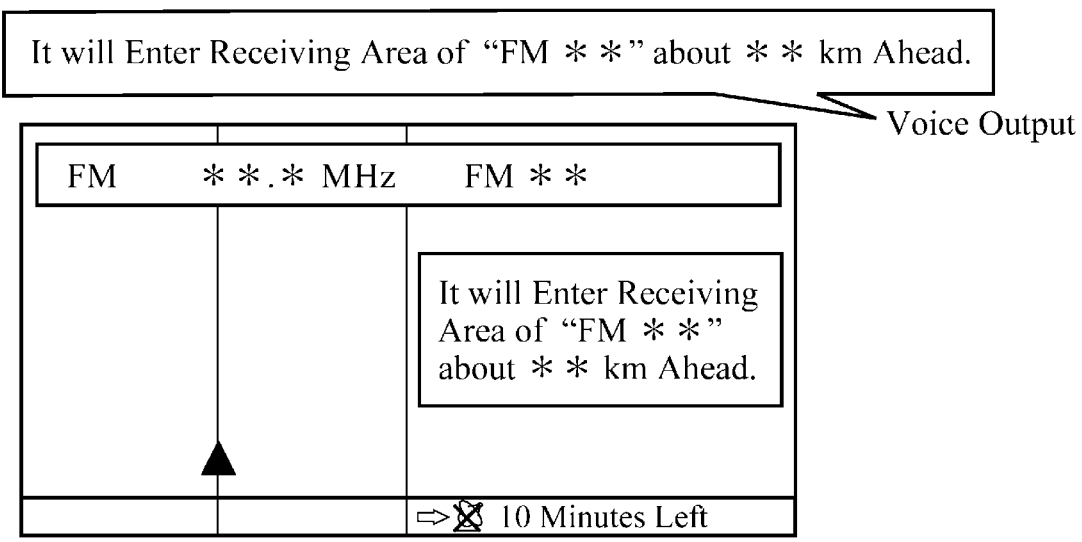
FIG. 10 is a diagram showing a picture displayed when the navigation system of the embodiment 1 in accordance with the present invention can receive a broadcast wave continuously.

In addition, when a broadcast wave receivable area is detected  km ahead during traveling, a picture showing that a receivable area of the currently received broadcasting station exists  km ahead is displayed on the screen of the display 27 as shown in FIG. 10, for example, and the voice guidance is given. Furthermore, an estimated time period to the receivable area is shown on the screen of the display 27. This holds true when no route is present.

Figure 3:
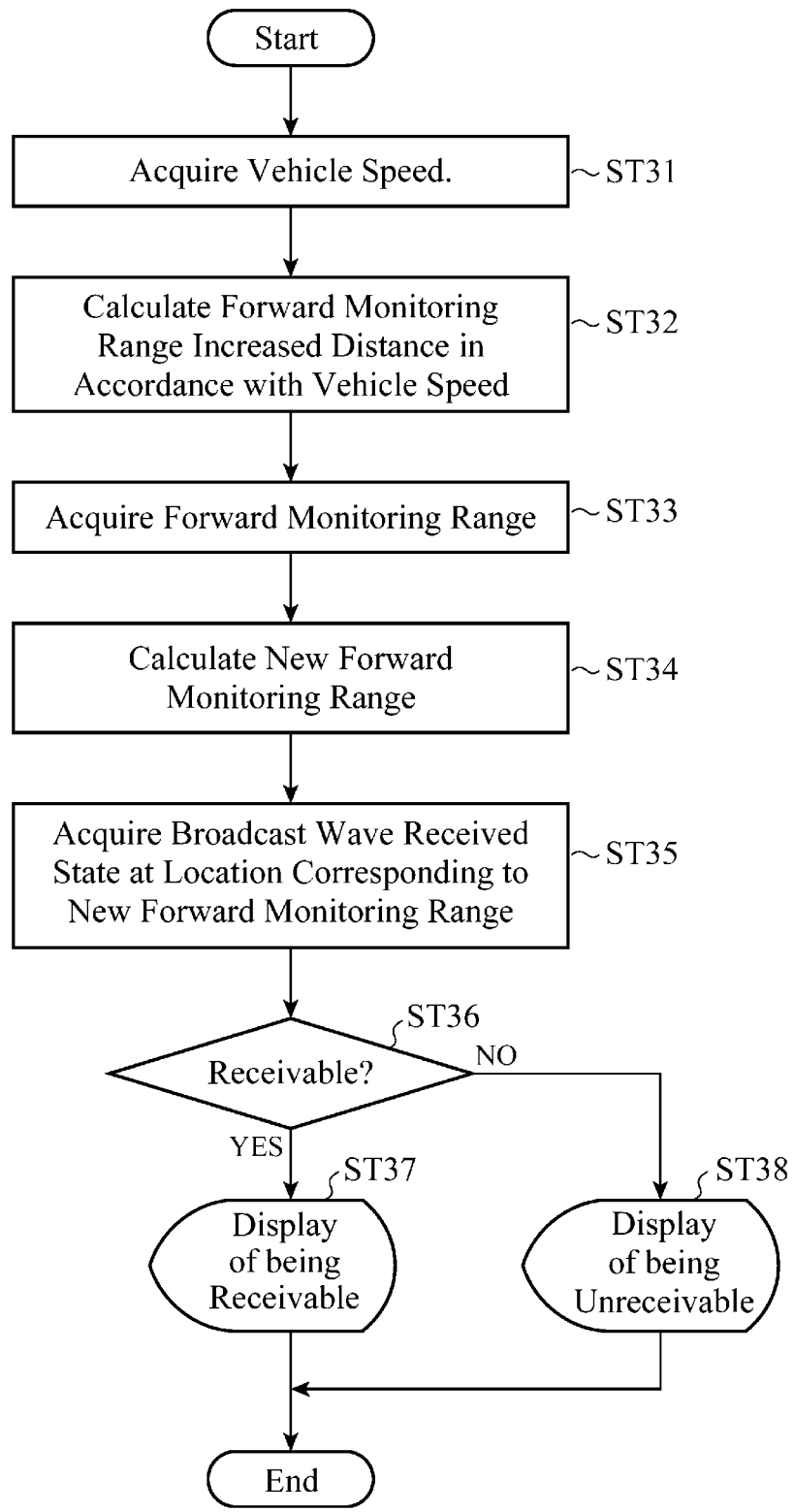
FIG. 3 is a flowchart showing details of broadcast wave received state monitoring processing executed in the broadcast wave received state informing processing shown in FIG. 2.

Next, details of the broadcast wave received state monitoring processing executed at step ST13 and step ST21 of the above-mentioned broadcast wave received state informing processing will be described with reference to the flowchart shown in FIG. 3.

In the broadcast wave received state monitoring processing, the vehicle speed is acquired, first (step ST31). More specifically, the received state detecting unit 17 acquires the vehicle speed information from the vehicle speed sensor 14. Subsequently, in accordance with the vehicle speed acquired at step ST31, the forward monitoring range increased distance is calculated (step ST32). More specifically, the received state detecting unit 17 calculates the distance by which the forward monitoring range is extended in accordance with the vehicle speed indicated by the vehicle speed information acquired from the vehicle speed sensor 14.

Subsequently, the forward monitoring range is acquired (step ST33). More specifically, the received state detecting unit 17 acquires the forward monitoring range input by the user via the monitoring range input unit 13. Subsequently, the forward monitoring range increased distance calculated at step ST32 is added to the forward monitoring range acquired at step ST33 to calculate a new forward monitoring range (step ST34). More specifically, the received state detecting unit 17 calculates the new forward monitoring range by adding the forward monitoring range increased distance to the forward monitoring range. This makes it possible to automatically increase the forward monitoring range appropriately in accordance with the traveling speed. For example, when the traveling speed is 60 km/h or more, it can perform such a job as extending the monitoring range up to 1 km ahead.

Subsequently, the broadcast wave received state at a location corresponding to the new forward monitoring range is acquired (step ST35). More specifically, the received state detecting unit 17 acquires the broadcast wave received state at the location corresponding to the new forward monitoring range calculated at step ST34 by referring to the broadcast wave receiving area information delivered from the receiving area detecting unit 16.

Subsequently, whether the broadcast is receivable or not is checked according to the broadcast wave received state acquired at step ST35 (step ST36). If a decision is made at this step ST36 that it is receivable, a picture indicating that it is receivable is displayed on the screen of the display 27 (step ST37). After that, the broadcast wave received state monitoring processing is terminated. On the other hand, if a decision is made at step ST36 that it is not receivable, a picture indicating that it is unreceivable is displayed on the screen of the display 27 (step ST38), and then the broadcast wave received state monitoring processing is completed.

As described above, according to the navigation system of the embodiment 1 in accordance with the present invention, it can notify the user in advance of the broadcast wave receivable state ahead of the guidance route in accordance with the broadcast wave receivable area information and broadcast wave reception blocked area information stored in the map database 11 beforehand. Accordingly, it can prevent a sudden broadcast wave unreceivable state the user does not expect, and enable the user to change the route or the direction of travel when desiring to continuously receive the currently receiving broadcast.

Incidentally, the navigation system of the above-mentioned embodiment 1 can be configured in such a manner that when the broadcast wave reception blocked area on the route or in the direction of travel cannot be circumvented, it switches the output of the broadcast received by the broadcast wave receiving tuner 19 to the output of another AV (Audio Visual) source or turns down the volume before it becomes unable to receive the broadcast wave continuously.

In addition, a configuration is also possible which enables a user to decide whether or not to display a telop for confirming whether to receive the above-mentioned received broadcast wave continuously or not until the arrival at the destination.

Furthermore, the broadcast wave received state can be recorded as follows. More specifically, the navigation system acquires the broadcast wave received state at the current position of the vehicle, and displays an icon corresponding to the intensity of the broadcast wave on the map. When the icon is touched in this state, the map database update management unit 12 records the broadcast wave received state at the current position of the vehicle in the map database 11. Incidentally, types of the icon displayed can be set as follows.

(1) broadcast wave: strong (green)
(2) broadcast wave: rather strong (yellow green)
(3) broadcast wave: moderate (yellow)
(4) broadcast wave: rather weak (orange)
(5) broadcast wave: weak (red)
(6) broadcast wave: unreceivable (gray)

INDUSTRIAL APPLICABILITY

A navigation system in accordance with the present invention can notify a user of the received state of the broadcast wave at timing earlier than a conventional system. Accordingly, it is suitable for applications to vehicles having a broadcast receiver mounted thereon together with a navigation system.

What is claimed is:
1. A navigation system comprising:
a map database that stores map information, broadcast wave receivable area information indicating an area capable of receiving a broadcast wave, and broadcast wave reception blocked area information indicating an area incapable of receiving the broadcast wave;
a current position detecting unit for detecting a current position;
a control unit for estimating a direction of travel from the current position detected by the current position detecting unit, and for deciding, from the broadcast wave receivable area information and the broadcast wave reception blocked area information acquired from the map database, as to whether the area capable of receiving the broadcast wave continuously exists in the direction of travel estimated; and an output unit for producing a message indicating existence of the area capable of receiving the broadcast wave continuously in response to a decision result of the control unit, wherein, the control unit comprises a guidance route arithmetic unit for searching for a route which connects the current position to a destination and is capable of receiving the broadcast wave continuously according to the broadcast wave receivable area information and the broadcast wave reception blocked area information acquired from the map database; and the output unit shows the route searched for by the guidance route arithmetic unit, and produces a message indicating whether the route searched for includes the area incapable of receiving the broadcast wave continuously or not.

2. The navigation system according to claim 1, further comprising:

a map database update management unit for updating the broadcast wave receivable area information and the broadcast wave reception blocked area information stored in the map database.

3. The navigation system according to claim 1, wherein the control unit causes, when the area incapable of receiving the broadcast wave continuously exists in the direction of travel estimated, the output unit to display an estimated time period up to a point of time at which the broadcast wave becomes unreceivable continuously.

4. The navigation system according to claim 1, wherein the control unit causes, when the area incapable of receiving the broadcast wave continuously exists on the route searched for by the guidance route arithmetic unit, the output unit to display an estimated time period up to a point of time at which the broadcast wave becomes unreceivable continuously.

5. The navigation system according to claim 1, further comprising a monitoring range input unit for inputting a monitoring range of observing a received state of the broadcast wave, wherein the control unit makes a decision as to whether the broadcast wave can be received continuously in the monitoring range input from the monitoring range input unit.

6. The navigation system according to claim 5, further comprising a vehicle speed sensor for detecting a traveling speed, wherein the control unit varies the monitoring range input from the monitoring range input unit in accordance with the traveling speed obtained from the vehicle speed sensor.

7. The navigation system according to claim 1, further comprising a broadcast wave receiving tuner for receiving the broadcast wave, wherein the control unit, when the area incapable of receiving the broadcast wave continuously exists in the direction of travel estimated, switches an output of the broadcast wave received by the broadcast wave receiving tuner to an output of an AV source, or turns down volume of the output of the broadcast wave before receiving the broadcast wave continuously becomes difficult.

8. The navigation system according to claim 1, further comprising a broadcast wave receiving tuner for receiving the broadcast wave, wherein the control unit, when the area incapable of receiving the broadcast wave continuously exists on the route searched for by the guidance route arithmetic unit, switches an output of the broadcast wave received by the broadcast wave receiving tuner to an output of an AV source, or turns down volume of the output of the broadcast wave before receiving the broadcast wave continuously becomes difficult.

* * * * *